US012406253B2

(12) United States Patent
Walters et al.

(10) Patent No.: US 12,406,253 B2
(45) Date of Patent: *Sep. 2, 2025

(54) LOCALIZED BLOCKCHAIN UTILIZING MESH NETWORKS FOR LOCALIZED EVENTS

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US); Reza Farivar, Champaign, IL (US)

(73) Assignee: Capital One Services, LLC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,967

(22) Filed: Nov. 18, 2022

(65) Prior Publication Data

US 2023/0081978 A1 Mar. 16, 2023

Related U.S. Application Data

(63) Continuation of application No. 16/182,222, filed on Nov. 6, 2018, now Pat. No. 11,514,434.

(51) Int. Cl.
*G06Q 20/36* (2012.01)
*G06Q 20/06* (2012.01)
(Continued)

(52) U.S. Cl.
CPC ....... *G06Q 20/3678* (2013.01); *G06Q 20/065* (2013.01); *G06Q 20/1085* (2013.01);
(Continued)

(58) Field of Classification Search
None
See application file for complete search history.

(56) References Cited

U.S. PATENT DOCUMENTS 10,839,378 B1 * 11/2020 Srinivasan ........... G06Q 20/401
11,176,531 B1 * 11/2021 Tomkins ................ G06N 20/00
(Continued)

FOREIGN PATENT DOCUMENTS

AU 2010249214 A1 * 6/2011 ............. G06Q 20/10
CA 3114288 A1 * 4/2020 ......... H04L 41/0893
(Continued)

OTHER PUBLICATIONS

P.-W. Chen, B.-S. Jiang and C.-H. Wang, "Blockchain-based payment collection supervision system using pervasive Bitcoin digital wallet," 2017 IEEE 13th International Conference on Wireless and Mobile Computing, Networking and Communications https://ieeexplore.ieee.org/document/8115844?source=IQplus (Year: 2017).*
(Continued)

*Primary Examiner* — El Mehdi Oussir
(74) *Attorney, Agent, or Firm* — KDW FIRM PLLC (57) ABSTRACT

Techniques for providing a localized blockchain that uses a mesh network to facilitate transactions for a localized event are provided. An electronic device can receive data from a localized mesh network to establish the device as a node on the localized mesh network. The established node can generate a cryptocurrency wallet that can be loaded with an initial amount of localized cryptocurrency tokens from a total amount of localized cryptocurrency tokens. The total amount of localized cryptocurrency tokens can be previously mined by a central authority of the localized mesh network. The established node can conduct transactions within the localized mesh network utilizing the localized cryptocurrency tokens. The established node can receive a portion of a cryptocurrency token for transmitting transac-
(Continued)

tional data to a next nearest node on the localized mesh network to help facilitate a transaction involving other nodes on the network.

16 Claims, 7 Drawing Sheets

(51) Int. Cl.
*G06Q 20/10* (2012.01)
*G06Q 20/16* (2012.01)
*G06Q 20/22* (2012.01)
*G06Q 30/06* (2023.01)
*H04L 9/00* (2022.01)

(52) U.S. Cl.
CPC ........... *G06Q 20/16* (2013.01); *G06Q 20/223* (2013.01); *G06Q 30/06* (2013.01); *G06Q 2220/00* (2013.01); *H04L 9/50* (2022.05)

(56) References Cited

U.S. PATENT DOCUMENTS

| | | | | |
|---|---|---|---|---|
| 11,282,139 | B1* | 3/2022 | Winklevoss | G06Q 40/04 |
| 2007/0248047 | A1* | 10/2007 | Shorty | H04L 45/44 |
| | | | | 370/329 |
| 2009/0070263 | A1* | 3/2009 | Davis | G06Q 20/322 |
| | | | | 705/44 |
| 2015/0046337 | A1* | 2/2015 | Hu | G06Q 20/36 |
| | | | | 705/41 |
| 2015/0254640 | A1* | 9/2015 | Cassano | G06Q 20/36 |
| | | | | 705/71 |
| 2015/0348017 | A1* | 12/2015 | Allmen | G06Q 20/367 |
| | | | | 705/76 |
| 2016/0210626 | A1* | 7/2016 | Ortiz | G06Q 20/12 |
| 2017/0017958 | A1* | 1/2017 | Scott | G06Q 20/40 |
| 2018/0293573 | A1* | 10/2018 | Ortiz | G06Q 20/102 |
| 2018/0337769 | A1* | 11/2018 | Gleichauf | G06Q 20/29 |
| 2019/0028278 | A1* | 1/2019 | Gilson | H04L 9/3247 |
| 2019/0303363 | A1* | 10/2019 | Leung | G06F 9/5044 |
| 2019/0362340 | A1* | 11/2019 | Strong | G06Q 20/3674 |
| 2020/0160340 | A1* | 5/2020 | Walters | G07C 13/00 |
| 2020/0258061 | A1* | 8/2020 | Beadles | H04L 63/102 |
| 2020/0356989 | A1* | 11/2020 | Shamai | H04L 9/0833 |
| 2021/0314325 | A1* | 10/2021 | Rose | G06N 3/08 |
| 2021/0319436 | A1* | 10/2021 | Ow | G06Q 20/0658 |
| 2022/0020016 | A1* | 1/2022 | Scott | G06Q 20/023 |
| 2022/0309511 | A1* | 9/2022 | Metnick | G06Q 20/401 |
| 2022/0393881 | A1* | 12/2022 | Ow | G06Q 20/3678 |
| 2023/0281617 | A1* | 9/2023 | Duris | G06Q 30/01 |
| | | | | 705/41 |
| 2024/0242276 | A1* | 7/2024 | Sanghvi | G06Q 20/389 |
| 2025/0086607 | A1* | 3/2025 | Hernandez | H04W 40/20 |

FOREIGN PATENT DOCUMENTS

| | | | | | |
|---|---|---|---|---|---|
| CA | 3141042 | A1 | * | 12/2020 | ............ H04L 12/46 |
| CA | 2944598 | C | * | 10/2023 | .......... G06Q 20/102 |
| CN | 109741039 | A | * | 5/2019 | |
| CN | 110024422 | A | * | 7/2019 | ......... G06F 16/1824 |
| CN | 110097462 | A | * | 8/2019 | .......... G06Q 20/065 |
| CN | 113056764 | A | * | 6/2021 | .......... G06Q 20/027 |
| CN | 109979580 | B | * | 7/2022 | ......... G06F 16/9535 |
| CN | 115956252 | A | * | 4/2023 | ............ G06Q 20/02 |
| CN | 115968483 | A | * | 4/2023 | ............ G06Q 20/02 |
| CN | 118475944 | A | * | 8/2024 | .......... G06Q 20/065 |
| KR | 20190136563 | A | * | 12/2019 | |
| KR | 20200004493 | A | * | 1/2020 | |
| KR | 20200009836 | A | * | 1/2020 | |
| KR | 20200022827 | A | * | 3/2020 | |
| KR | 20240107111 | A | * | 10/2022 | |
| WO | WO-2013082190 | A1 | * | 6/2013 | ........... G06F 21/577 |
| WO | WO-2015144971 | A1 | * | 10/2015 | .......... G06Q 20/065 |
| WO | WO-2017182601 | A1 | * | 10/2017 | ............ G06Q 20/36 |
| WO | WO-2019208861 | A1 | * | 10/2019 | .......... G06Q 20/065 |
| WO | WO-2020025141 | A1 | * | 2/2020 | .......... G06Q 20/027 |
| WO | WO-2023154203 | A1 | * | 8/2023 | ......... G06Q 20/0655 |
| WO | WO-2024137428 | A1 | * | 6/2024 | |

OTHER PUBLICATIONS

Dash: A Privacy-Centric Crypto-Currency. https://bitconomia.com/whitepaper/DASHEN1519698560867.pdf (Year: 2015).*
Bitcoin and Beyond: A Technical Survey on Decentralized Digital Currencies. https://eprint.iacr.org/2015/464.pdf (Year: 2015).*
S. Shiravale and V. Shrikanth, "Blockchain Technology: A Novel Approach in Information Security Research," 2018 3rd International Conference on Inventive Computation Technologies (ICICT), Coimbatore, India, 2018, pp. 587-590. https://ieeexplore.ieee.org/document/9034382?source=IQplus (Year: 2018).*
Cai W. et al., "Decentralized Applications: The Blockchain-Empowered Software System," 2018, Cornell University. https://arxiv.org/abs/1810.05365 (Year: 2018).*
Hu, Yining et al., A Delay-Tolerant Payment Scheme Based on the Ethereum Blockchain. https://arxiv.org/abs/1801.10295 (Year: 2018).*

* cited by examiner

LOCALIZED BLOCKCHAIN UTILIZING MESH NETWORKS FOR LOCALIZED EVENTS

CROSS-REFERENCE TO RELATED APPLICATIONS

This application claims priority to and is a continuation of U.S. patent application Ser. No. 16/182,222, entitled "LOCALIZED BLOCKCHAIN UTILIZING MESH NETWORKS FOR LOCALIZED EVENTS" filed on Nov. 6, 2018. The contents of the aforementioned application are incorporated herein by reference in their entirety.

TECHNICAL FIELD

Embodiments described herein generally relate to use of a localized blockchain within a mesh network.

BACKGROUND

During events such as festivals or at locations such as arcades and amusement parks, cash is often used for transactions. Using cash at such events or locations can increase a risk of cash being stolen or a risk of cash being skimmed by employees.

Accordingly, what is needed is an alternative form of payment to facilitate transactions within a specific geographical area and/or for a specific period of time that reduces the risk associated with using cash.

SUMMARY OF THE DISCLOSURE

This disclosure presents various systems, components, and methods related to using a localized blockchain within a mesh network. Each of the systems, components, and methods disclosed herein provides one or more advantages over conventional systems, components, and methods.

Various embodiments include techniques for providing a localized blockchain that uses a mesh network to facilitate transactions for a localized event. Data relating to a localized mesh network can be received and stored by an electronic device such as, for example, a smartphone. The electronic device can be established as a node on the localized mesh network based on the stored received data. The established node can generate and store a cryptocurrency wallet. The established node can load the generated cryptocurrency wallet with an initial amount of localized cryptocurrency tokens from a total amount of localized cryptocurrency tokens. The total amount of localized cryptocurrency tokens can be previously mined by a central authority of the localized mesh network. The total amount of localized cryptocurrency tokens can exist only on the localized mesh network. The established node can conduct transactions within the localized mesh network utilizing the localized cryptocurrency tokens. The established node can receive a portion of a cryptocurrency token for transmitting transactional data to a next nearest node on the localized mesh network to help facilitate a transaction involving other nodes on the network. The use of localized cryptocurrency tokens can reduce risks associated with using cash for transactions within localized events. Other embodiments are disclosed and described.

DETAILED DESCRIPTION

Figure 1:
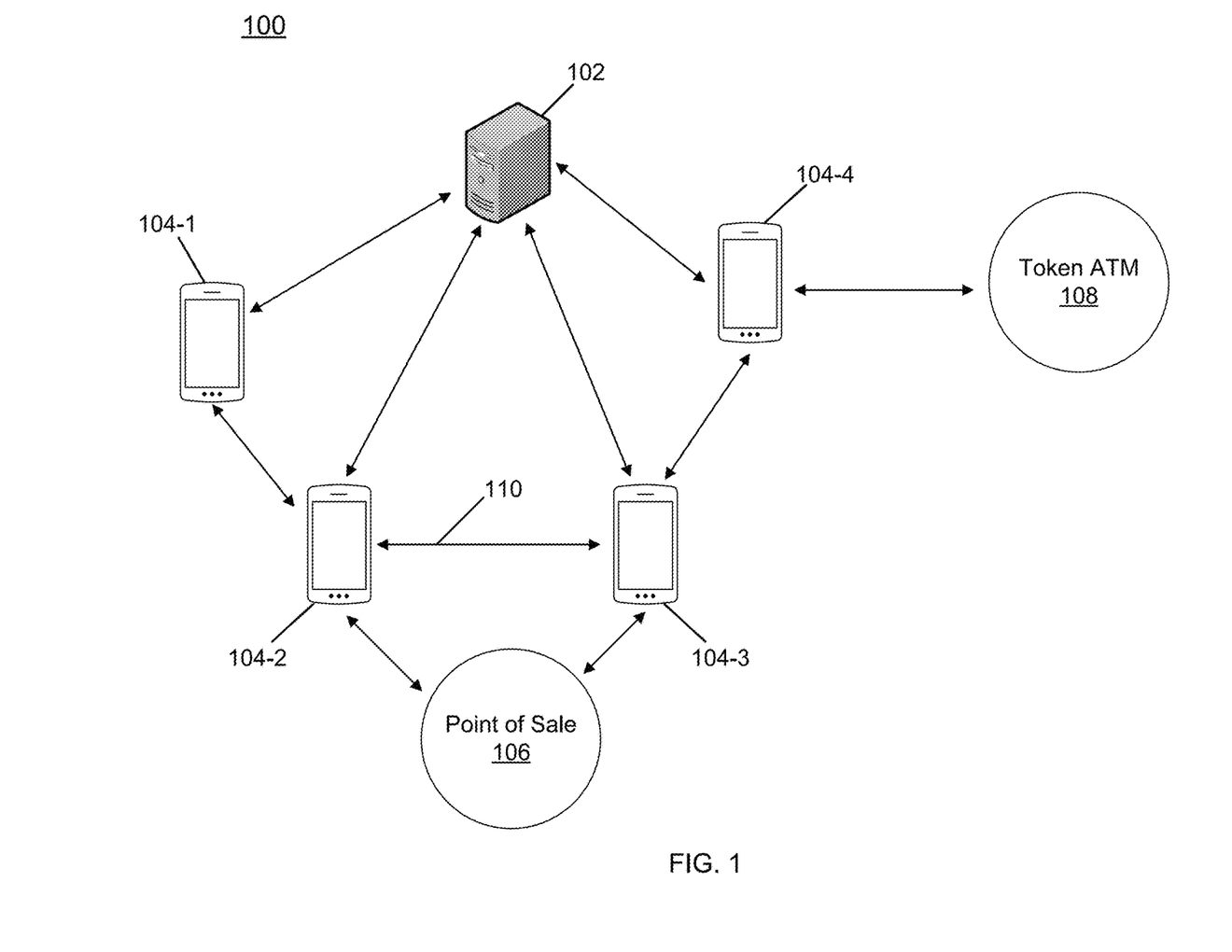
FIG. 1 illustrates an operating environment.

FIG. 1 illustrates an operating environment 100 such as may be representative of various embodiments in which techniques for providing a localized blockchain utilizing a mesh network may be implemented. The operating environment 100 can be a mesh network 100 and can include a central node 102, a first node 104-1, a second node 104-2, a third node 104-3, a fourth node 104-4, a point of sale (POS) node 106, and an automatic teller machine (ATM) 108 node. The mesh network 100 is not limited to the number and type of nodes depicted in FIG. 1.

In various embodiments, the mesh network 100 can be any type of mesh network and can operate according to any known mesh networking protocol or standard. In various embodiments, data, traffic, messages, or other communications within the mesh network 100 can be transmitted from an initial node to a desired recipient node through one or more intermediate nodes, with intermediate nodes passing communications intended for the desired recipient node to a next nearest neighbor or node. Path 110 can represent a communication path between any two nodes on the mesh network 100 (e.g., the node 104-2 and the node 104-3). Other paths 110 between adjacent nodes are shown in FIG. 1 but are not labeled for simplicity.

In various embodiments, the next nearest neighbor or node can be a node that is located closest by distance (e.g., geographically closest to the node). In various embodiments, the next nearest neighbor or node can be the node that can be reached with the lowest transmission power in comparison to a node located further away that may require a higher transmission power to reach.

In various embodiments, a central authority can own and operate the mesh network 100 and can be represented by the central node 102. For purposes of discussion herein, reference to the central node 102 can include or represent reference to the central authority and together or individually may be referred to as the central authority/central node 102. The central authority, for example, can be an individual, a business owner, a company, a corporation, and/or a legal entity. The central node 102 can set up and establish the mesh network 100, can operate and maintain the mesh network 100, and/or can disable and destroy the mesh network 100. The mesh network 100 can be established for a specific and/or limited period of time and/or can be established over a specific and/or limited geographical area.

The mesh network 100 can be established in association to a specific event such as, for example, a music festival. In various embodiments, the mesh network 100 can be intended to be established over a restricted or limited amount of time and/or area and in relation to a specific event or venue that can also be managed, owned, and/or operated by the central authority. For purposes of discussion, the mesh network 100 can be referred to as a localized mesh network 100 to reflect the limited duration and/or geographical footprint of the localized mesh network 100.

The nodes 104 can represent any type of node capable of operating on the mesh network 100. For purposes of illustration and explanation only, four nodes 104 are shown in FIG. 1, but the number of nodes 104 capable of operating on the mesh network 100 is not so limited as any number of nodes 104 can be included within the mesh network 100. The nodes 104 can represent any type of electronic and/or computing device maintained by an operator or user including, for example, a smartphone, a tablet, a laptop, or any other consumer electronic device capable of operating as a node 104 on the mesh network 100. In various embodiments, the user of a node 104 can be an attendee of an event operated by the central authority.

The POS node 106 can represent any type of POS or vendor. The POS node 106 can be authorized by the central authority/central node 102 to conduct transactions related to any type of good or service using the mesh network 100. For purposes of illustration and explanation only, a single POS node 106 is shown in FIG. 1 but the number of POS nodes capable of operating on the mesh network 100 is not so limited as any number of POS nodes 106 can be included within the mesh network 100. The nodes 104 and the POS node 106 can all be considered nodes operating on the mesh network 100.

For purposes of discussion herein, reference to any node (e.g., the node 104-1 or the POS node 106) can refer to the electronic and/or computing device operating as the node and/or the user or operator of the electronic and/or computing device operating as the node. For example, reference to the node 104-1 can refer to an attendee of an event whose smartphone operates as the node 104-1. As a further example, reference to the node 106 can refer to a vendor of an event whose computing device operates as the node 106.

The central authority/central node 102 can set up and manage the mesh network 100 to facilitate transactions between any of the nodes 104 and the POS node 106—for example, between any of the nodes 104 and/or between any one node 104 and the POS node 106. In various embodiments, the central authority/central node 102 can set up, operate, and/or manage a localized blockchain and related localized cryptocurrency on the mesh network 100 to facilitate transactions among the nodes on the mesh network 100. In various embodiments, the localized blockchain can be stored on and managed by the central node 102. The localized cryptocurrency can be established to facilitate transactions on the mesh network 100. In various embodiments, the localized cryptocurrency is limited to use over the limited duration and area of the mesh network 100. Accordingly, the localized cryptocurrency may only be used within the mesh network 100 and cannot be used outside of the mesh network 100—and, for example, may not be used after the mesh network 100 is destroyed or torn down.

In various embodiments, establishment and use of the localized blockchain and related localized cryptocurrency can allow transactions to be conducted without the use of conventional currency (e.g., paper money or coins) and/or other conventional forms of payment (e.g., check, debit card, credit card, etc.). In various embodiments, the central authority/central node 102 can mine a certain amount of the localized cryptocurrency tokens. For example, the central authority/central node 102 can mine the certain amount of cryptocurrency tokens prior to allowing any nodes onto the mesh network 100 and/or prior to opening the area or venue (e.g., prior to the music festival opening) to other nodes. In various embodiments, this can be considered to be pre-mining a predetermined amount of localized cryptocurrency tokens. In various embodiments, reference to a cryptocurrency tokens can refer to a certain amount of cryptocurrency or a certain value of cryptocurrency.

The cryptocurrency tokens generated by the central authority/central node 102 can be distributed to any of the nodes 104 or the POS node 106. The nodes 104 and the POS 106 can then use the localized cryptocurrency tokens to conduct transactions within the localized mesh network 100 without having to rely on cash or other traditional payment forms. Utilizing a localized blockchain on a localized mesh network 100 with a pre-mined amount of localized cryptocurrency tokens can provide a number of benefits. For example, by obviating the need for traditional currency and/or payment methods, the central authority does not need to have cash on hand. The load on a credit card payment network can also be reduced while risks associated with skimming or stealing can be significantly reduced.

Described herein are techniques for the nodes 104 and the POS node 106 to join the mesh network 100, to facilitate transactions between other nodes 104/106 on the mesh network 100 and to earn payment for doing so, and to initiate a transaction with another node 104/106 on the mesh network and to submit payment for doing so. These techniques allow the central authority to receive all money or payments upfront related to issued cryptocurrency tokens which are then used to facilitate transactions. The central authority can then operate without the need to manage traditional forms of currency and payment (e.g., the central authority does not need to have cash on hand or to support credit card payment methods). Further, the nodes 104/106 are to be within range of other nodes on the mesh network 100 in order to conduct a transaction, ensuring transactions related to the mesh network 100 are confined to a certain geographical area and time frame.

In various embodiments, the nodes 104/106—prior to being established on the mesh network 100—can be positioned within an area covered by the mesh network 100 (e.g., an attendee of the music festival walks into the festival venue with her smartphone). The nodes 104/106—as an electronic device and/or computing device—can receive data or other information relating to the localized mesh network 100. In various embodiments, an application (app) or other program can be downloaded onto the electronic device and/or computing device of the attendee which can then establish the electronic device and/or computing device as a node 104/106 on the localized mesh network 100.

After an electronic device and/or computing device is established as a node 104/106 capable of operating on the mesh network 100, the node 104/106 can generate a cryptocurrency wallet. The generated cryptocurrency wallet can be stored on the node 104/106 (e.g., on the electronic device and/or computing device established as a node on the mesh network 100).

After generating a cryptocurrency wallet, a user can load the generated cryptocurrency wallet with an initial amount of localized cryptocurrency tokens. The initial amount of localized cryptocurrency tokens can be a portion of a total amount of localized cryptocurrency tokens, with the total amount of localized cryptocurrency tokens previously mined by the central authority/central node 102. As described herein, in various embodiments, the total amount of localized cryptocurrency tokens may only exist on the localized mesh network 100 and/or may only be used within the mesh network 100.

In various embodiments, the nodes 104/106 can be issued localized cryptocurrency tokens directly from the central authority/central node 102. As an example, an electronic device and/or computing device of a user that is operating as one of the nodes 104/106 can be issued a set amount of cryptocurrency tokens based on a corresponding amount of non-cryptocurrency money. In various embodiments, an electronic device of a user that is operating as one of the nodes 104/106 can transfer a certain amount of traditional, non-cryptocurrency money to the central authority/central node 102 (e.g., through a traditional form of payment such as cash, check, credit card, etc.). In response, the central authority/central node 102 can issue a corresponding (e.g., by value) amount of localized cryptocurrency tokens to the electronic device and/or computing device of a user that is operating as one of the nodes 104/106. As a result, the nodes 104/106 can then have a cryptocurrency wallet loaded with a certain amount of localized cryptocurrency tokens.

In various embodiments, the central authority/central node 102 can preload a certain amount of localized cryptocurrency tokens onto the ATM 108 or can otherwise make a certain amount of localized cryptocurrency tokens available through the ATM 108. After a user of an electronic device and/or computing that is operating as one of the nodes 104/106 provides payment or other confirmation to the central authority/central node 102, the ATM 108 can issue a certain amount of localized cryptocurrency tokens to the nodes 104/106. In various embodiments, the ATM 108 can directly issue the tokens to the nodes 104/106. In various embodiments, the ATM 108 can provide the nodes 104/106 with a code that users of the nodes 104/106 can use to download a certain amount of localized cryptocurrency tokens over the mesh network 100. Under either scenario, the nodes 104/106 can then have a cryptocurrency wallet loaded with a certain amount of localized cryptocurrency tokens. In various embodiments, ATM 108 can be referred to as a token ATM (or a cryptocurrency token ATM).

For purposes of explanation, an example transaction between the node 104-1 and the POS node 106 can be described. The node 104-1 can be an electronic device and/or a computing device of a user. The user can be an attendee to a music festival. The electronic device and/or computing device of the user can be a smartphone. The smartphone of the user can be operating as the node 104-1 on the mesh network 100. The node 104-1 can indicate to other components of the mesh network 100 that it is operating on the mesh network 100. The node 104-1 can be associated with a cryptocurrency wallet that is loaded with a first amount of localized cryptocurrency tokens.

Similarly, the POS node 106 can be an electronic device and/or computing device of a user. The user can be an attendee to a music festival as well and/or can be a vendor of the music festival that sells goods or services at the music festival (e.g., t-shirts, food, massages, etc.) The electronic device and/or computing device of the user can be a smartphone. The smartphone of the user can be operating as the POS node 106 on the mesh network 100. The POS node 106 can indicate to other components of the mesh network 100 that it is operating on the mesh network 100. The POS node 106 can be associated with a cryptocurrency wallet that is loaded with a second amount of localized cryptocurrency tokens.

Continuing with the example transaction, in reference to FIG. 1, the node 104-1 can request to purchase a good (e.g., a t-shirt) from the POS node 106. In various embodiments, the node 104-1 can transmit a request to conduct a transaction with the POS node 106. The request can be received by the node 104-2 and re-transmitted to the POS node 106. The POS node 106 can accept the request and can accept payment from the node 104-1. The POS node 106 can transmit an acknowledgement to the node 104-1. The acknowledgement can include confirmation of acceptance of payment and confirmation that the requested good will be provided to the node 104-1.

The transmitted acknowledgment can be received by the node 104-2. The node 104-2 can retransmit the acknowledgment to the node 104-1. The payment can be indicated in the transmitted request from the node 104-1 and can indicate payment in the form of localized cryptocurrency tokens. Any number of messages containing data or information related to the transaction between the node 104-1 and the POS node 106 can be transmitted and received between the node 104-1 and the POS node 106. Any number of intermediate nodes—for example, the node 104-2—can facilitate the transaction by relaying any of the messages between the node 104-1 and the POS node 106.

In various embodiments, the central authority/central node 102 can track and/or monitor the transaction between the node 104-1 and the POS node 106 and can add information related to the transaction to the localized blockchain. As part of operating on the mesh network 100, the node 104-1 can be required to provide a payment or fee to the intermediate node 104-2 which helped facilitate the transaction. In this way, any node of the mesh network 100 can receive payments in cryptocurrency tokens for facilitating transactions between other nodes. Payments for facilitating transactions can be made to any number of intermediate nodes and can vary for each message transmitted back and forth between the node 104-1 and the POS node 106 based on movement of any of the nodes (e.g., can vary based on the number of intermediate nodes involved).

For example, two intermediate nodes may retransmit the initial transaction request from the node 104-1 to the POS node 106 while three intermediate nodes may retransmit the acknowledgement from the POS node 106 to the node 104-1. In various embodiments, the node 104-1 may be required to provide payments to each of these nodes. In various embodiments, such payments can be referred to as transactional fee payments. The payments can be for small amounts of cryptocurrency tokens and can be viewed as a transactional tax.

In various embodiments, other parties may be responsible for some of these payments. For example, a certain portion of the payments (e.g., those related to the transmission of the acknowledgment to the node 104-1) can be the responsibility of the POS node 106. In general, any distribution of cost responsibilities can be established with an example being the first node 104-1 that requests the transaction being entirely responsible. Payments to the intermediate nodes from the transactional node 104-1 (or transacting node 104-1) can be verified and recorded by the central authority/central node 102 through the localized blockchain. In various embodiments, payments to these intermediate nodes can be for fixed amounts of cryptocurrency tokens or can vary based on, for example, the number of nodes involved, the type of transaction, or the parties involved in the transaction.

Based on the aforementioned example, the nodes 104/106 can earn cryptocurrency tokens by facilitating transactions—for example, by transferring transactional information between an initiating transactional node and a receiving transactional node. These nodes can include the POS node 106 or can be two attendee nodes 104.

Figure 2:
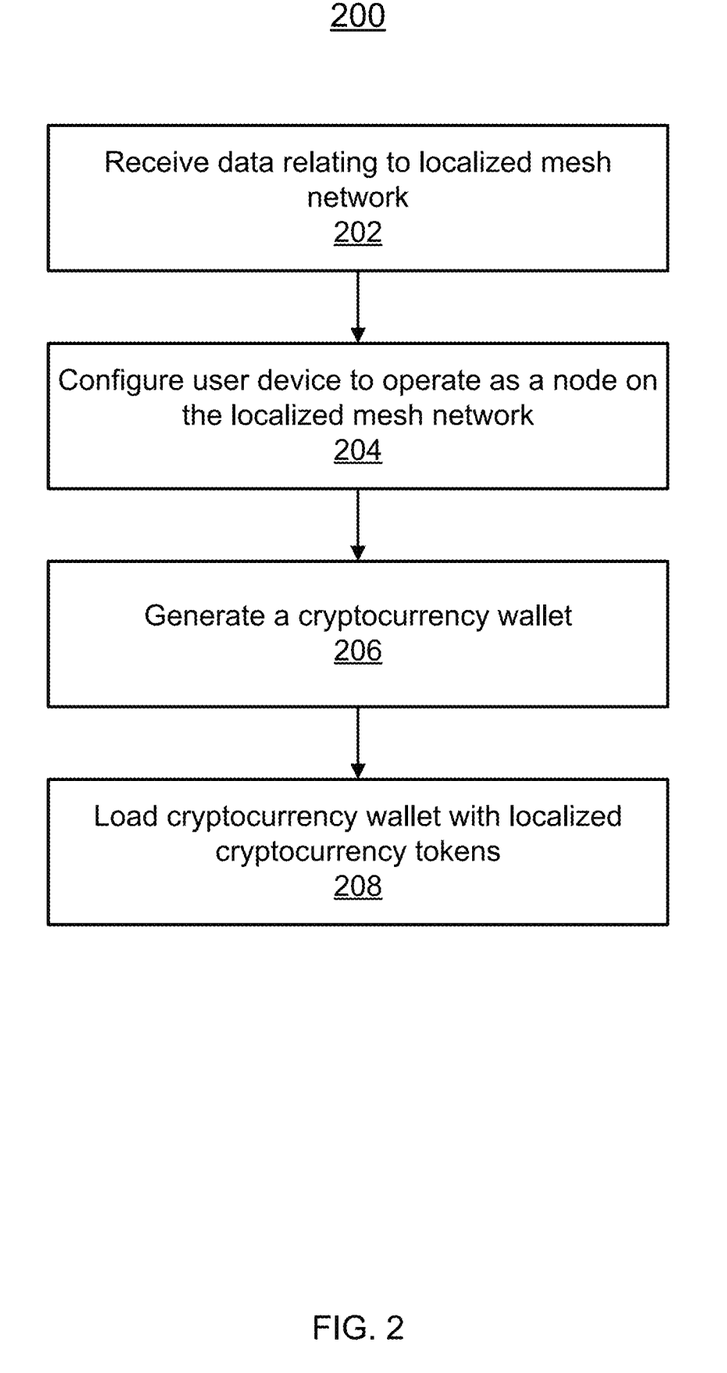
FIG. 2 illustrates a first logic flow.

FIG. 2 illustrates an example of a logic flow 200 that may be representative of techniques for enabling an electronic device and/or a computing device to operate as a node on a localized mesh network and to generate a cryptocurrency wallet to facilitate use of localized cryptocurrency tokens. For example, the logic flow 200 may be representative of operations that may be performed in various embodiments by any constituent component of the localized mesh network 100 (e.g., the nodes 104, the POS node 106, the ATM node 108, or the central node 102) depicted in FIG. 1.

At 202, an electronic device and/or computing device of a user can receive data relating to a localized mesh network. The electronic device and/or computing device can store the received data in a storage device of the electronic device and/or computing device. The electronic device and/or computing device can be, for example, a smartphone. The user can be, for example, an attendee of an event associated with the localized mesh network. The localized mesh network can be, for example, the mesh network 100.

At 204, the electronic device and/or computing device can be configured to operate as a node on the localized mesh network 100 based on the stored received data. As an example, the electronic device and/or computing device can be established as the node 104-1. The node 104-1 can operate within the localized mesh network 100.

At 206, the electronic device/node 104 can generate a cryptocurrency wallet. The cryptocurrency wallet can be stored in the storage device of the electronic device/node 104.

At 208, the electronic device/node 104 can load the generated cryptocurrency wallet with an initial amount of localized cryptocurrency tokens from a total amount of localized cryptocurrency tokens. The total amount of localized cryptocurrency tokens can be available as previously mined by a central authority of the localized mesh network 100. The central authority of the localized mesh network 100 can be or can operate as the central node 102. In various embodiments, the total amount of localized cryptocurrency tokens can exist (e.g., can only be used) on the localized mesh network 100.

In various embodiments, the electronic device/node 104 can load the generated cryptocurrency wallet with the initial amount of localized cryptocurrency tokens by directly interacting with the central node 102. In various embodiments, the electronic device/node 104 can load the generated cryptocurrency wallet with the initial amount of localized cryptocurrency tokens by interacting with the token ATM node 108.

After 208, as an example, the node 104-1 can conduct a transaction with any other node operating on the mesh network 100 and/or can facilitate transactions between any other nodes operating on the mesh network 100.

Figure 3:
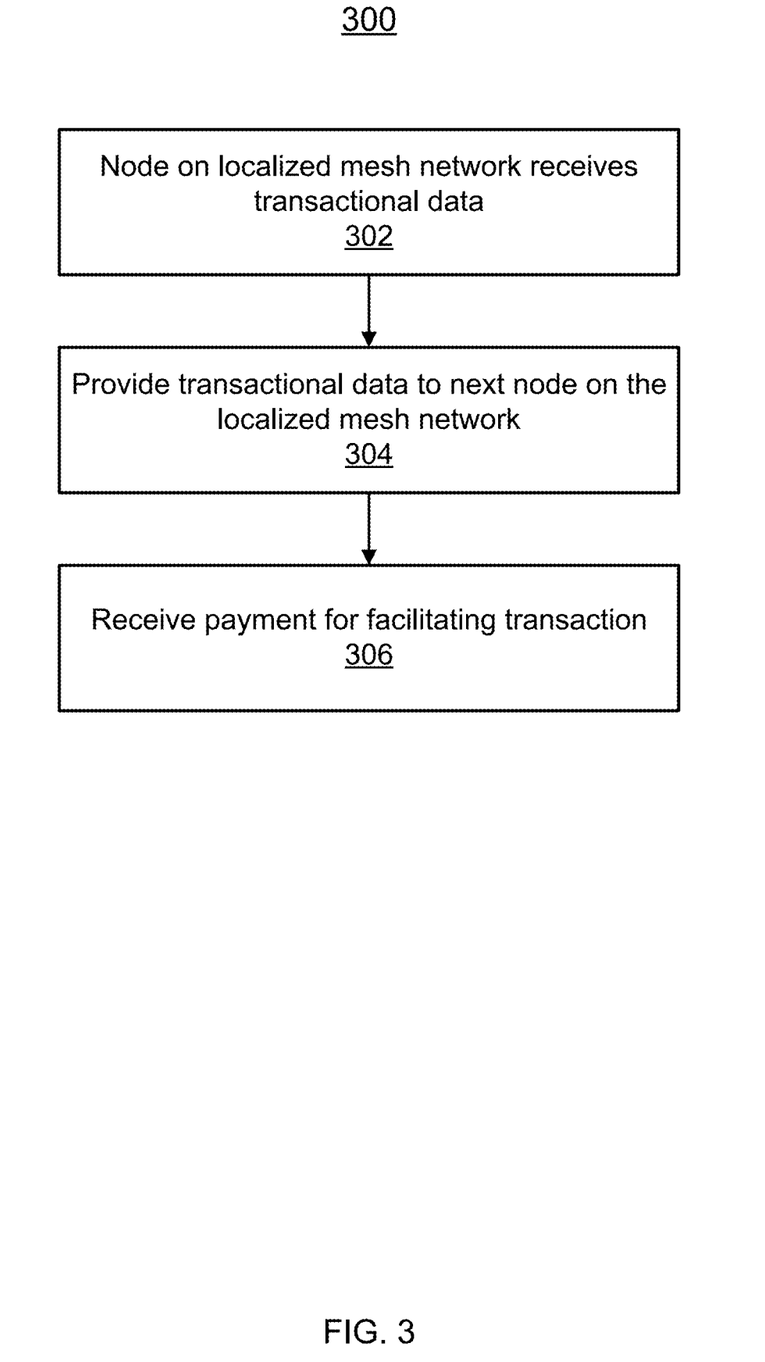
FIG. 3 illustrates a second logic flow.

FIG. 3 illustrates an example of a logic flow 300 that may be representative of techniques for enabling a node on a localized mesh network to facilitate a transaction involving localized cryptocurrency tokens. For example, the logic flow 300 may be representative of operations that may be performed in various embodiments by any constituent component of the localized mesh network 100 (e.g., the nodes 104, the POS node 106, the ATM node 108, or the central node 102) depicted in FIG. 1.

At 302, a node 104 (e.g., the node 104-3) on the localized mesh network 100 can receive a message. The message can include transactional information or data. The transactional data can relate to a transaction involving other nodes (e.g., the node 104-2 and the node 104-4) on the localized mesh network 100. The transactional data can relate to a request for a transaction or an acknowledgement or an acceptance of a requested transaction. As an example, the message containing the transactional data can be transmitted by the node 104-2 with the intent of the transactional data being provided to the node 104-4.

At 304, the node 104-3 can determine that the message containing the transaction data is intended for the node 104-4. Accordingly, in accordance with operation on the localized mesh network 100, the node 104-3 can forward the message containing the transactional data to the node 104-4.

In various embodiments, the node 104-3 can generate a new message that contains the transactional data.

In various embodiments, the node 104-3 can be considered a facilitating node or an intermediate node since it is not a party to the transaction but helps facilitate the transaction by routing message, data, or information related to the transaction to other intermediate nodes and/or the nodes that are parties to the transaction. In various embodiments, the node 104-2 can be considered to be a first party to the transaction and/or a requesting node of the transaction. In various embodiments, the node 104-4 can be considered to be a second party to the transaction and/or a responding node of the transaction.

At 306, the node 104-3 can receive a payment for facilitating the transaction between the node 104-2 and the node 104-4. Any of the nodes 104-2, 104-3, and/or 104-4 can track and monitor the involvement of the node 104-3 to help facilitate the transaction between the nodes 104-2 and 104-4. In various embodiments, the payment to the node 104-3 can be based on the number of times the node 104-3 receives and/or transmits data related to the transaction. In various embodiments, the payment to the node 104-3 can be based on an amount of data related to the transaction that the node 104-3 receives and/or transmits.

In various embodiments, the payment to the node 104-3 can be set by the central authority/central node 102. In various embodiments, the payment to the node 104-3 can be made with cryptocurrency funds (e.g., tokens) of the node 104-2 and/or the node 104-4. In various embodiments, the responding node can be the POS node 106. In various embodiments, a portion of a cryptocurrency token can be provided to the node 104-3 each time the node 104-3 transmits data related to a transaction to a next nearest node on the localized mesh network 100. The node 104-3 can then store the received portion of the cryptocurrency token within the generated cryptocurrency wallet of the node 104-3.

In various embodiments, payment to the node 104-3 can be based on supporting any portion of the transaction such as, for example, verifying funds (e.g., cryptocurrency tokens or resources of the node 104-2 within the localized mesh network 100) and/or facilitating any management operations of the central authority/central node 102 in maintaining the localized blockchain on the localized mesh network 100.

Figure 4:
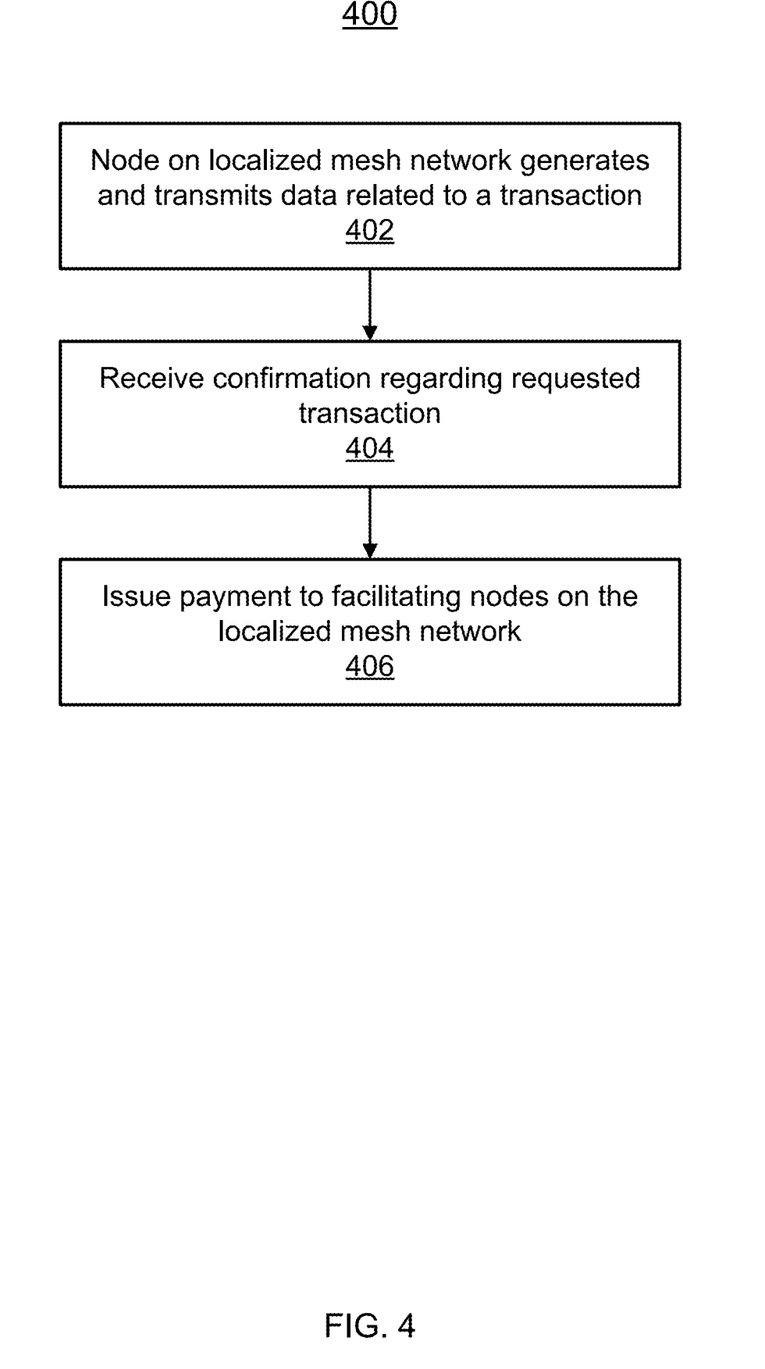
FIG. 4 illustrates a third logic flow.

FIG. 4 illustrates an example of a logic flow 400 that may be representative of techniques for enabling a node on a localized mesh network to conduct a transaction involving localized cryptocurrency tokens. For example, the logic flow 400 may be representative of operations that may be performed in various embodiments by any constituent component of the localized mesh network 100 (e.g., the nodes 104, the POS node 106, the ATM node 108, or the central node 102) depicted in FIG. 1.

At 402, a node 104 (e.g., the node 104-1) on the localized mesh network 100 can generate and transmit data related to a transaction. The data related to a transaction can be a request to conduct a transaction such as, for example, a request to purchase a good (e.g., a t-shirt) from the POS node 106. The node 104-1 can include the transactional related data in a message intended to be received by the POS node 106. The message can be transmitted to the node 104-2 with knowledge that the node 104-2 will provided the transactional data to the POS node 106.

One or more messages can be generated and transmitted by the node 104-1 in relation to the transaction. In various embodiments, the node 104-1 can be considered to be a requesting transactional node.

At 404, the node 104-1 can receive confirmation that the requested transaction has been accepted and/or completed. As an example, the POS node 106, in response to receiving the data related to the requested transactional originally generated by the node 104-1, can generate data indicating acceptance of the requested transaction. The generated response data can be included in a message transmitted by the POS node 106. The transmitted message can be received by the node 104-2. The node 104-2 can re-transmit the message or can re-package the message for transmission to the node 104-1. Under either scenario, the node 104-2 can transmit the responsive transactional data generated by the POS node 106 to the node 104-1.

At 406, the node 104-1 can issue a payment to the node 104-2. At 406, the transaction between the node 104-1 and the POS node 106 can be completed. Consequently, as part of operation on the localized mesh network 100, the node 104-1 can be required to provide a payment to the node 104-2 for facilitating the transaction—for example, by passing messages, data, or information related to the transaction between the node 104-1 and the POS node 106. The payment by the node 104-1 can be overseen and/or authorized by the central authority/central node 102. The central authority/central node 102 can update the localized blockchain to reflect the payment to the node 104-2 by the node 104-1.

In various embodiments, the payment to the node 104-2 can be based on a number of messages passed by the node 104-2, a size of the messages passed by the node 104-2, the type of transaction, the number of intermediate nodes, or any other factor related to the transaction.

Figure 5:
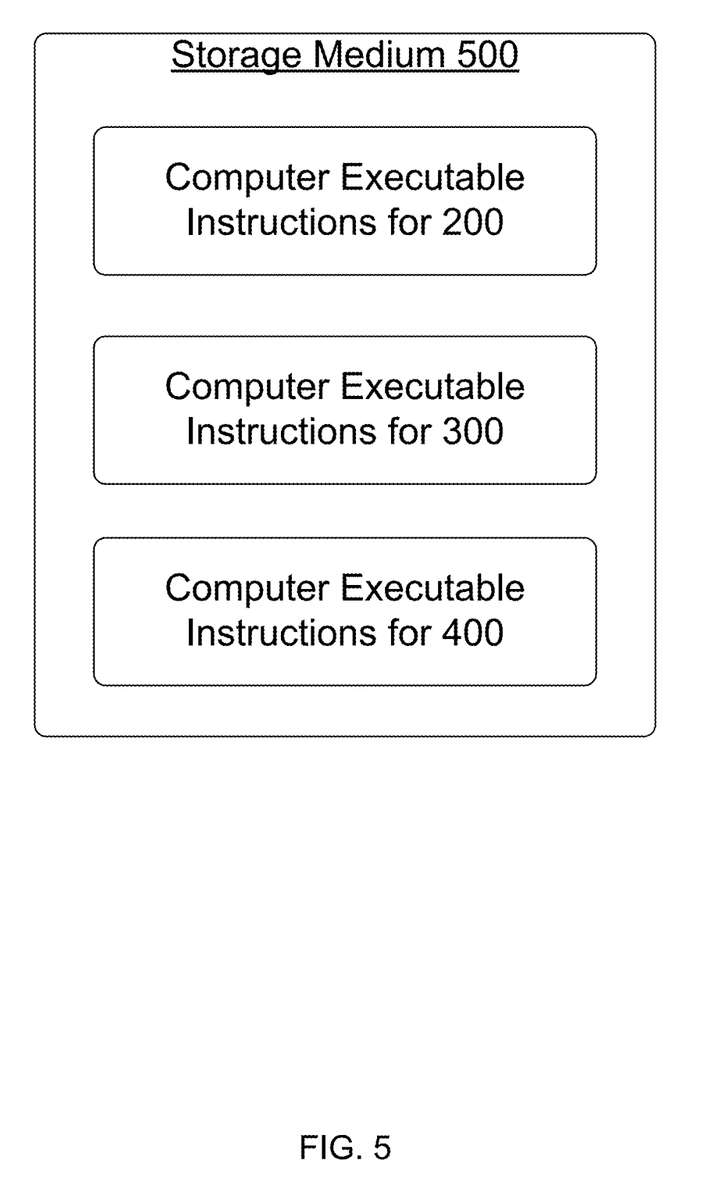
FIG. 5 illustrates a storage medium.

FIG. 5 illustrates a storage medium 500. Storage medium 500 may represent an implementation of a storage device of any electronic device and/or computing device that may operate as a node within the localized mesh network 100 of FIG. 1. The storage medium 500 can comprise any non-transitory computer-readable storage medium or machine-readable storage medium. In various embodiments, the storage medium 500 can comprise a physical article of manufacture. In various embodiments, storage medium 8500 can store computer-executable instructions, such as computer-executable instructions to implement one or more of logic flows or operations described herein, such as the logic flow 200 of FIG. 2, the logic flow 300 of FIG. 3, and/or the logic flow 400 of FIG. 4. In various embodiments, storage medium 500 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 6:
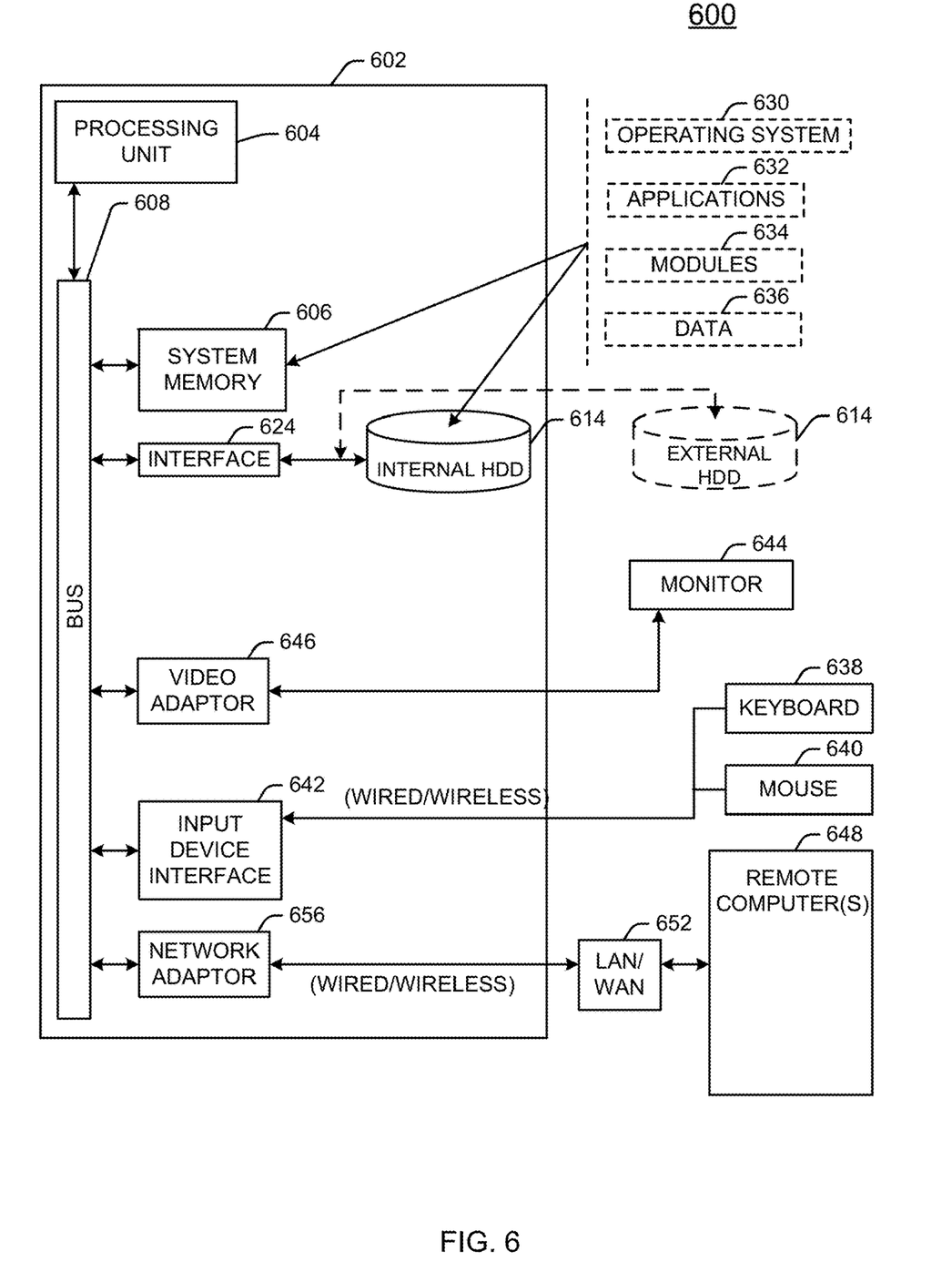
FIG. 6 illustrates a computing architecture.

FIG. 6 illustrates a computing architecture 600 that can implement various embodiments described herein. In various embodiments, the computing architecture 600 can comprise or be implemented as part of an electronic device and/or a computing device. In various embodiments, the computing architecture 600 can represent an implementation of any constituent component of the localized mesh network 100 (e.g., the nodes 104, the POS node 106, the ATM node 108, or the central node 102) depicted in FIG. 1. One or more of the constituent components of the computing architecture 600, and/or any constituent component of the localized mesh network 100, can be implemented in hardware, software, or any combination thereof including implementation based on a storage device (e.g., a memory unit) and logic, at least a portion of which is implemented in circuitry and coupled to the storage device. The logic can be or can include a processor or controller component.

The computing architecture 600 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 6, the computing architecture 600 can comprise a computer 602 having a processing unit 604, a system memory 606 and a system bus 608. The processing unit 604 can be any of various commercially available processors or can be a specially designed processor.

The system bus 608 provides an interface for system components including, but not limited to, an interface between the system memory 606 and the processing unit 604. The system bus 608 can be any of several types of bus structure that may further interconnect to a memory bus (with or without a memory controller), a peripheral bus, and a local bus using any of a variety of commercially available bus architectures.

The system memory 606 can include any type of computer-readable storage media including any type of volatile and non-volatile memory. The computer 602 can include any type of computer-readable storage media including an internal (or external) hard disk drive (HDD) 614. In various embodiments, the computer 602 can include any other type of disk drive such as, for example, a magnetic floppy disk and/or an optical disk drive. The HDD 614 can be connected to the system bus 608 by a HDD interface 624.

In various embodiments, any number of program modules can be stored in the drives and memory units 606 and/or 614 such as, for example, an operating system 630, one or more application programs 632, other program modules 634, and program data 636.

A user can enter commands and information into the computer 602 through one or more wired/wireless input devices such as, for example, a keyboard 638 and a pointing device, such as a mouse 640. These and other input devices can be connected to the processing unit 604 through an input device interface 642 that is coupled to the system bus 608. A monitor 644 or other type of display device can also be connected to the system bus 608 via an interface, such as a video adaptor 646. The monitor 644 may be internal or external to the computer 602

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a smartphone, a tablet, a peer device or other common network node, and typically includes many or all of the elements described relative to the computer 602. The logical connections depicted include wired and/or wireless connectivity to networks 652 such as, for example, a local area network (LAN) and/or larger networks, for example, a wide area network (WAN). Networks 652 can provide connectivity to a global communications network such as, for example, the Internet. A network adapter 656 can facilitate wired and/or wireless communications to the networks 652. The computer 602 is operable to communicate over any known wired or wireless communication technology, standard, or protocol according to any known computer networking technology, standard, or protocol.

Figure 7:
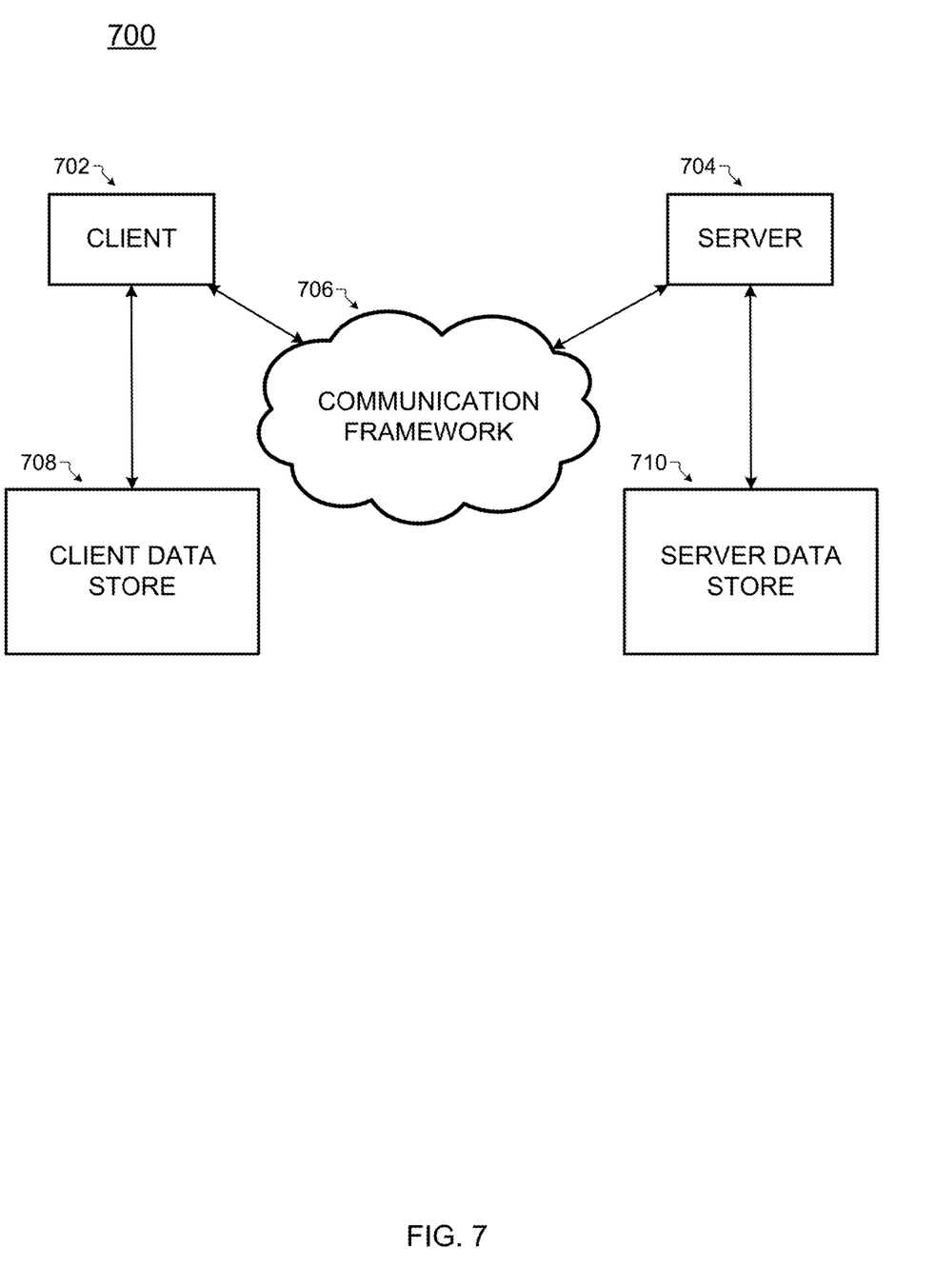
FIG. 7 illustrates a communication architecture.

FIG. 7 illustrates a block diagram of a communication architecture 700. The communication architecture 700 can implement various embodiments described herein. As shown in FIG. 7, the communication architecture 700 comprises one or more clients 702 and servers 704. One of the clients 702 and/or one of the servers 704 can represent any constituent component of the localized mesh network 100 (e.g., the nodes 104, the POS node 106, the ATM node 108, or the central node 102) depicted in FIG. 1.

The client 702 and the server 704 can be operatively connected to a client data store 708 and a server data store 710, respectively, that can be employed to store information local to the respective client 702 and server 704. In various embodiments, the client 702 and/or the server 704 can implement one or more of logic flows or operations described herein.

The client 702 and the server 704 can communicate data or other information between each other using a communication framework 706. The communications framework 706 can implement any known communications technique or protocol. The communications framework 706 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 706 can operate over any communication media according to any networking technology including any wired or wireless communications standard or protocol, or any combination thereof.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A computing device, comprising:
   a network interface,
   a storage device including instructions, and
   a processor coupled with the storage device, the processor capable of executing the instructions, that when executed, cause the processor to:
   execute an application on the computing device, wherein the application is received via the network interface;
   receive, using the application via the network interface, control messages from a centralized node allowing the computing device to join a localized mesh network, wherein the localized mesh network comprises two or more nodes authorized to conduct transactions using the localized mesh network;
   process the control messages from the centralized node and establish the computing device as a node of the localized mesh network join the localized mesh network as a node thereof based on instructions contained in the control messages;
   generate a cryptocurrency wallet and store the generated cryptocurrency wallet in the storage device;
   load the generated cryptocurrency wallet with an initial amount of localized cryptocurrency tokens from a total amount of the localized cryptocurrency tokens for the localized mesh network;
   receive a request to perform a transaction with a point-of-sale node that is a member of the localized mesh network;
   communicate location data with other nodes on the localized mesh network to determine whether the computing device is within a predetermined distance of at least a second node in the localized mesh network, the second node being a node of the localized mesh network other than the point-of-sale node;
   receive, by the computing device from the other nodes, a determination that the computing device is within the predetermined distance of the second node in the localized mesh network and a date and time of the request to perform the transaction occurring within a predetermined time range; and
   in response to receiving the determination, complete the transaction with the point-of-sale node.

2. The computing device of claim 1, wherein the computing device is caused to generate the cryptocurrency wallet after the computing device is established as the node of the localized mesh network.

3. The computing device of claim 1, wherein execution of the application further configures the computing device to relay messages received from a first node in the localized mesh network to the second node or the point-of-sale-node in the localized mesh network.

4. The computing device of claim 1, wherein the processor is to load the generated cryptocurrency directly from the centralized node of the localized mesh network.

5. The computing device of claim 1, wherein the processor is further caused to receive the generated cryptocurrency from a token automatic teller machine (ATM) node.

6. The computing device of claim 1, wherein the processor is configured to execute additional instructions that cause the processor to:
   send data related to the transaction through the localized mesh network to the point-of-sale (POS) node on the localized mesh network;
   receive a confirmation that the transaction is accepted by the POS node; and
   issue payment onto the localized mesh network for the transaction.

7. The computing device of claim 6, wherein the data is sent to the POS node through one or more intermediary nodes.

8. The computing device of claim 7, wherein the processor is configured to execute additional instructions that cause the processor to issue a payment to each of the one or more intermediary nodes for sending the data to the POS no de.

9. A computer-implemented method, comprising:
installing a software application on a computing device;
receiving, using the software application via a network interface of the computing device, control messages from a centralized node allowing the computing device to join a localized mesh network, wherein the localized mesh network comprises two or more nodes authorized to conduct transactions using the localized mesh network;
processing, by a processor of the computing device, the control messages from the centralized node to thereby establish the computing device as a node of the localized mesh network according to instructions contained in the control messages;
generating, by the processor, a cryptocurrency wallet and storing the generated cryptocurrency wallet in a storage device;
loading, by the processor of the computing device, the generated cryptocurrency wallet with an initial amount of localized cryptocurrency tokens from a total amount of the localized cryptocurrency tokens for the localized mesh network;
receiving, by the processor of the computing device, a request to perform a transaction with a point-of-sale node that is a member of the localized mesh network;
communicating, by the processor of the computing device, location data with other nodes on the localized mesh network to determine whether the computing device is within a predetermined distance of at least a second node in the localized mesh network, the second node being a node of the localized mesh network other than the point-of-sale node;
receiving, by the processor of the computing device, a determination that the computing device is within the predetermined distance of the second node in the localized mesh network and a date and time of the request to perform the transaction occurring within a predetermined time range; and
in response to receiving the determination, completing, by the processor of the computing device, the transaction with the point-of-sale node.

10. The computer-implemented method of claim 9, wherein the computing device is caused to generate the cryptocurrency wallet after the computing device is established as the node of the localized mesh network.

11. The computer-implemented method of claim 9, wherein execution of the application further configures the computing device to relay messages received from a first node in the localized mesh network to the second node or the point-of-sale-node in the localized mesh network.

12. The computer-implemented method of claim 9, wherein the processor is to load the generated cryptocurrency directly from the centralized node of the localized mesh network.

13. The computer-implemented method of claim 9, wherein the processor is further caused to receive the generated cryptocurrency from a token automatic teller machine (ATM) node.

14. The computer-implemented method of claim 9, wherein the processor is configured to execute additional instructions that cause the processor to:
send data related to the transaction through the localized mesh network to the point-of-sale (POS) node on the localized mesh network;
receive a confirmation that the transaction is accepted by the POS node; and
issue payment onto the localized mesh network for the transaction.

15. The computer-implemented method of claim 14, wherein the data is sent to the POS node through one or more intermediary nodes.

16. The computer-implemented method of claim 15, wherein the processor is configured to execute additional instructions that cause the processor to issue a payment to each of the one or more intermediary nodes for sending the data to the POS node.

* * * * *

UNITED STATES PATENT AND TRADEMARK OFFICE
CERTIFICATE OF CORRECTION

| | |
|---|---|
| PATENT NO. | : 12,406,253 B2 |
| APPLICATION NO. | : 17/989967 |
| DATED | : September 2, 2025 |
| INVENTOR(S) | : Austin Grant Walters et al. |

It is certified that error appears in the above-identified patent and that said Letters Patent is hereby corrected as shown below:

In the Claims

Column 12, Lines 14-16, replace "localized mesh network join the localized mesh network as a node thereof based on instructions contained in the control messages" with --localized mesh network based on instructions contained in the control messages--;

Column 13, Line 4, replace "no de" with --node--.

Signed and Sealed this
Eleventh Day of November, 2025

John A. Squires
*Director of the United States Patent and Trademark Office*